United States Patent [19]
Sacerdoti et al.

[11] 3,811,740
[45] May 21, 1974

[54] SELF-CENTERING ROTARY MAGNETIC SUSPENSION DEVICE

[75] Inventors: Giancarlo Sacerdoti; Aldo Catitti; Luciano-Luigi Soglia, all of Rome, Italy

[73] Assignee: Comitato Nazionale Per L'Energia Nucleare (CNEN), Rome, Italy

[22] Filed: Apr. 24, 1972

[21] Appl. No.: 246,938

[30] Foreign Application Priority Data
Apr. 24, 1971 Italy .............................. 49943/71

[52] U.S. Cl. ................................................ 308/10
[51] Int. Cl. ...................................... F16c 39/06
[58] Field of Search ................... 308/10; 74/5, 5.47

[56] References Cited
UNITED STATES PATENTS
| | | | |
|---|---|---|---|
| 2,869,934 | 1/1959 | Milligan | 308/10 |
| 3,490,816 | 1/1970 | Lyman | 308/10 |
| 2,254,698 | 9/1941 | Hansen | 308/10 |
| 3,582,162 | 6/1971 | Baermann | 308/1 |
| 3,243,238 | 3/1966 | Lyman | 308/10 |

Primary Examiner—R. J. Skudy
Attorney, Agent, or Firm—Stevens, Davis, Miller & Mosher

[57] ABSTRACT

A self-centering magnetic device for suspensing rotating bodies which device comprises two suspension and centering units spaced along the rotation axis and one axial balancing unit interposed between said suspension and centering units which are known per se. The axial balancing unit comprises two identical magnetic elements each of which consists of a number of identical permanent magnets arranged in a starlike pattern around the rotation axis; these magnets are magnetized all parallel to the axis but one in one direction and the adjacent two in the opposite direction; a conductive disk is provided between the magnetic elements which disk during the suspended body rotation is forced towards a position intermediate between the magnetic element due to a reciprocal repulsive action between each magnetic element and the disk.

6 Claims, 4 Drawing Figures

SELF-CENTERING ROTARY MAGNETIC SUSPENSION DEVICE

This invention concerns a self-centering magnetic device for the suspension of rotating bodies and in particular of solids rotating about an axis of symmetry, that is, generated by a plane figure which rotates around its own axis of symmetry, and capable of rotating around said axis. Due to the function which the device must absolve, the latter is a vertical axis and the straight lines and planes which are perpendicular to it are horizontal. This axis will subsequently also be designated as the longitudinal axis and the horizontal straight lines and planes will also be called transverse straight lines and planes.

It is well known that it is possible to suspend a body by means of permanent magnets, even when axial equilibrium is unstable. On the other hand, it is also a well known fact that it is possible to suspend bodies by means of electrodynamic fields produced by coils powered by alternating current and acting on the integral metallic parts of the suspended object.

In a copending patent application filed by the same applicants is described a self-centering magnetic device for suspended loads which is based on the principle of combining with the action of a single permanent magnet on a ferromagnetic armature which is integral with the load, the electrodynamic action, exerted by several superimposed coils powered by alternating current, on metallic bodies which are good electrical conductors and which are also integral with the load.

These actions are envisioned in such a way that the permanent magnet suspends the greater part of the weight of the load, while the function of the coils is to bring the system into the pre-established axial position and to maintain it therein, furnishing only the difference between the sustaining action provided by the magnet and the weight of the body; under these conditions the resultants of the forces constituted by the weight of the armature and the load which is suspended and the force of attraction of the magnet are equal.

This supplementary suspension force automatically reinforces or opposes the force produced by the magnet, depending on whether the action required by the system for reaching axial equilibrium around a position previously established during the planning phase coincides with or opposes it.

In addition, one particular configuration of the armature permits radial centering of the load and the armature with respect to the permanent magnet. It should be observed, however, that in spite of the considerable progress this system represents with respect to previous tradutional solutions, the above described device requires external power, even though in small quantities, from a source of energy whose sole purpose is to provide stabilization of the axial equilibrium.

Therefore, the need was felt to provide a device which, while possessing all of the advantages of the previous solutions, does not present the disadvantage of requiring external power, and which furthermore has improved radial stability characteristics.

The principle upon which the device which is the object of this invention is based consists of utilizing, for primary suspension and radial centering of the load, two instead of one, permanents magnets which are identical and of the same type described in the previously mentioned copending patent application. These are located at the extremities of the axis of rotating of the device, thus permitting the centering forces to exert their action more efficiently, as shall be seen from the following.

Since the suspended body is to rotate, in operation the mobile part or moving element must revolve around the vertical axis of the device. The load may be attached to the mobile part of the device at any point whatsoever along the axis of rotation and must be dynamically balanced with respect to it.

The axial balancing action exerted by the electrical coils as described in the above mentioned application is replaced here by the electrodynamic action of a system of permanent magnets acting on one or more appropriately shaped elements made of material which is electrically conductive, which intercept the lines of flux of the magnets in such a way as to cut across them when the magnets or bodies are in relative movement.

In operation, this electrodynamic action consists of a repellent effect between the object and the magnets which will depend upon various parameters such as the distance between the object and the magnets, the thickness of the object, its electrical characteristics, the rotational speed, and the number of magnets.

The system of permanent magnets, which we shall call compensating, may be integral with the system of suspension magnets or to the rotating axis. Since the particular characteristics of the device must permit rotation of the rotary suspension system at a high speed, it is obvious that the means of propulsion adopted must not introduce friction which might degrade the innate suspension characteristics; in particular, mechanical contacts between the drive mechanism and the rotary part must be avoided.

Therefore, one primary advantage of this invention consists of the fact that it permits realization of a self-centering magnetic suspension device for rotating bodies in which the supporting and radial centering actions are exerted at two or more cross-sections along the axis of the rotating unit.

Another advantage is constituted by the fact that for its operation the unit does not require a separate source of energy to obtain the effect of support and axial balance.

A third advantage is represented by the fact that with the utilization of permanent magnets in lieu of coils, a device is obtained which is more compact, more easily produced on an industrial scale, and more economical.

A fourth advantage consists of the fact that it can be put into rotation by a wide variety of motors, provided that they are equipped with a rotor which gives no mechanical contact with the fixed parts of the device.

Other advantages will become evident from the following description and from examination of the figures of which:

Figure 1:
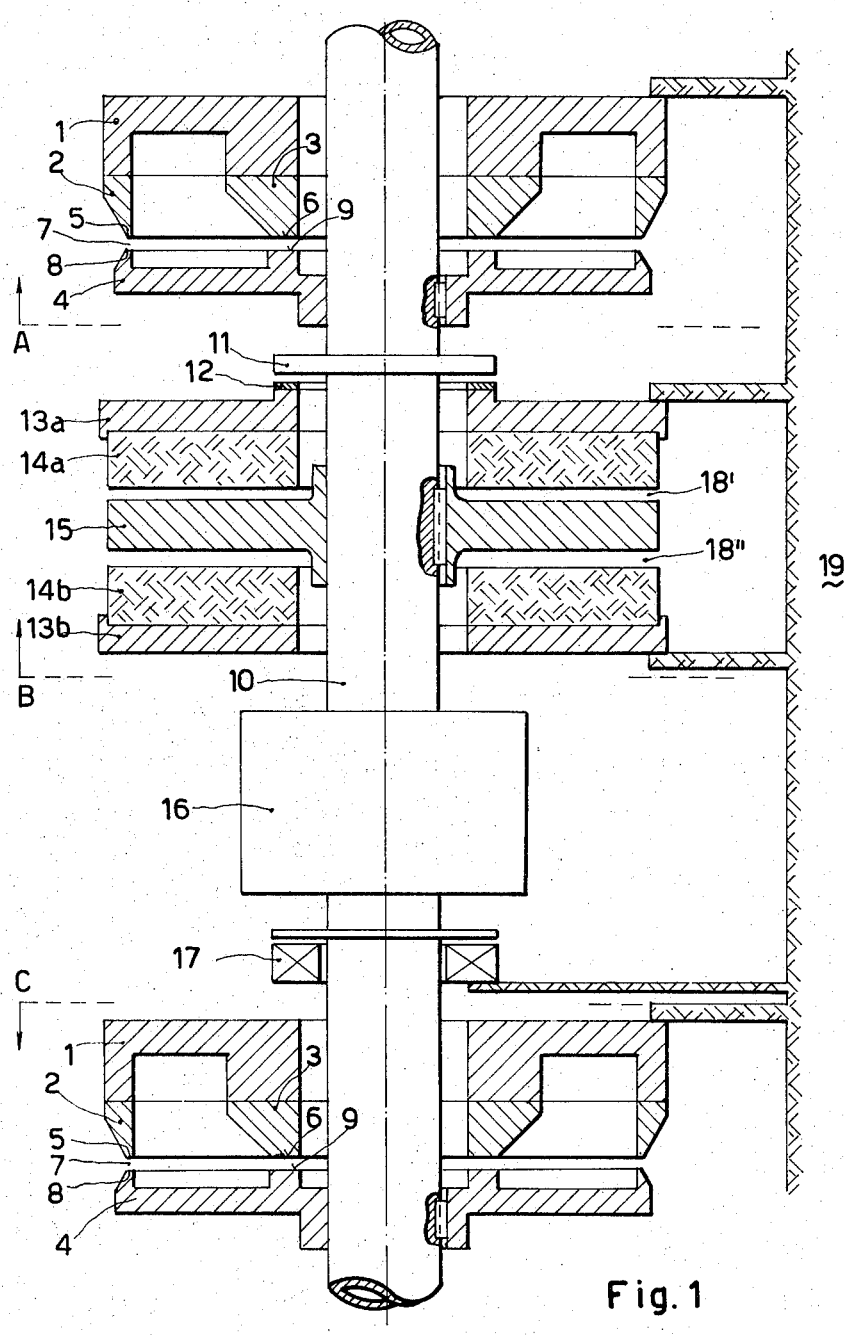
FIG. 1 represents a schematic cross-sectional view of the device as it was originally conceived, along the axis of rotation.

Referring to FIG. 1, in which all of the elements are understood to be attached to the support 19, the device involved in this invention can be considered to consists of the following essential parts:

Two identical suspension and radial centering units, the upper one of which is formed by components included above the broken line A and which will be designated as unit A, and the lower one, beneath line C, which will be called unit C; an axial stabilization unit included between broken lines A and B, which will be called unit B; a live load 16 and a drive mechanism 17.

Each of the suspension and radial centering units designated as A and C is composed of:

A ring-shaped permanent magnet 3 having a vertical axis and a rectangular section which is sharply tapered towards its lower base, while its upper surface is fixed in contact with the lower face of a circular projection which protrudes downward from a circular support 1 made of ferromagnetic material. This support extends horizontally and then vertically downward to the upper surface of an annular magnet 2 forming a shell which delimits a hollow space, also annular and opening downward, confined between the body comprised by magnet 3 and the circular projection of the support, and the shell itself, to the lower part of which is attached the above mentioned permanent magnet 2. The lower base of magnet 2 reaches the same level as the lower base of magnet 3 while the upper surface of magnet 2 is fixed in perfect contact with the lower base of above mentioned shell.

An armature 4 which closes the magnetic circuit consisting of the following elements: permanent magnet 2; ferromagnetic support 1; permanent magnet 3; air gap 7; and above mentioned armature 4. This armature is essentially discoid in form, coaxial with the above mentioned support, and is shaped so as to present on the face which is turned toward magnets 2 and 3 two circular projections 8 and 9 whose surfaces coincide with surfaces 5 and 6 located on the unit constituted by magnets 2 and 3. Specifically, projection 9 which faces magnet 2 consists of a circular relief having a flat upper surface and projection 8 consists of an annular relief tapering upwards, the upper rim of which faces the lower base of magnet 2.

The armatures which form a part of units A and C are rigidly connected to one another by means of shaft 10 which has a tubular cylindrical form and which also constitutes the main shaft of the device, while the magnet supports 1 are provided with a central hole through which the shaft can pass freely.

In one preferred embodiment, that part of both units A and C which includes the permanent magnets shall be considered fixed and integral with external support 19, while the portion integral with the armature, i.e., the shaft and the load, shall be considered mobile.

Figure 3:
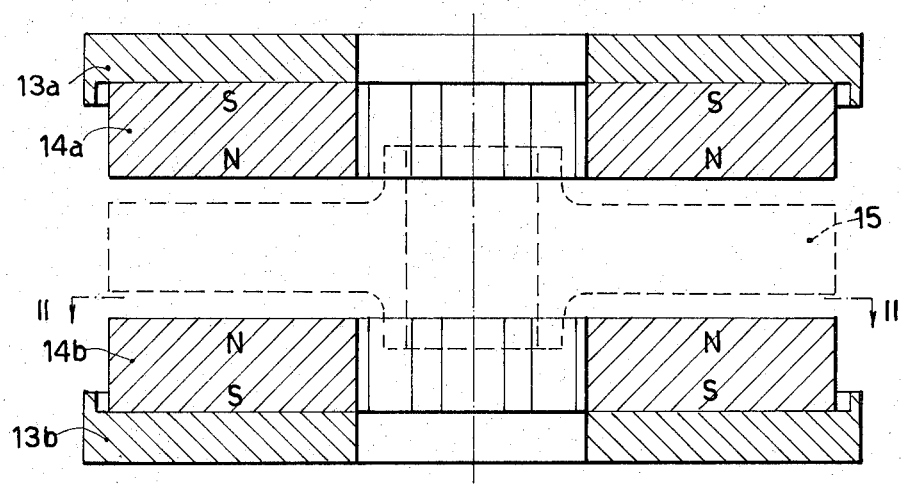
FIG. 3 is a diametral cross-section along section line III—III of FIG. 2, showing the system of magnets indicated in FIG. 2.
Figure 2:
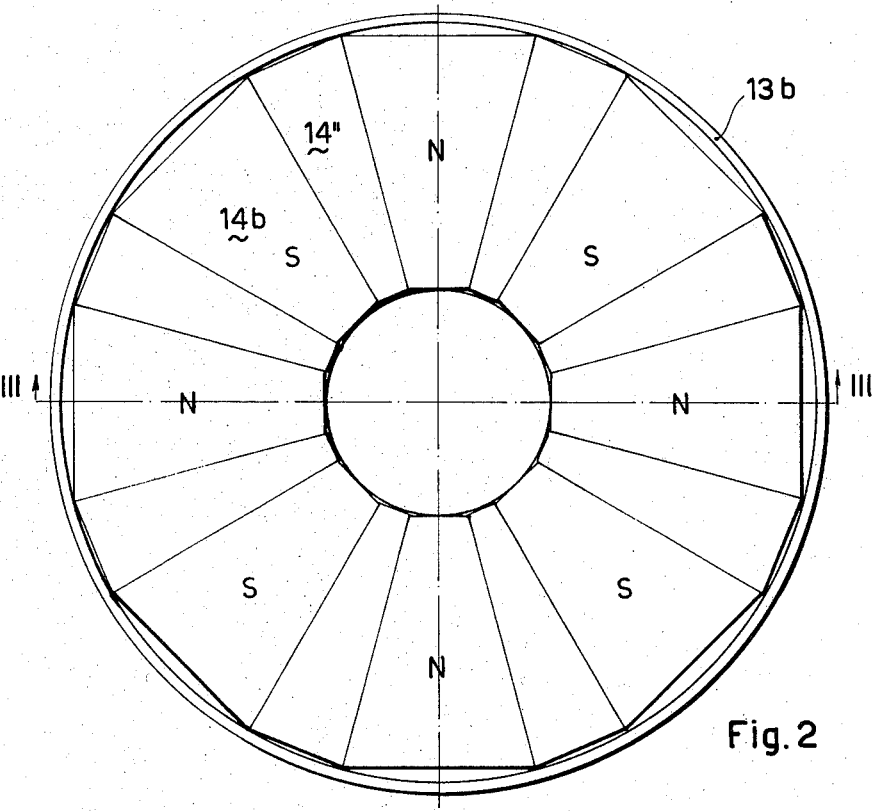
FIG. 2 is a plan view starting from section line II—II of FIG. 3, showing the magnets utilized for stabilization of axial balance, that is the compensating magnets.

Unit B, composed of the following elements: two identical units 14a and 14b which are integral with fixed support 19 and which contain a number of permanent magnets disposed in a starlike pattern (see FIGS. 2 and 3), of prismatic form, the plane of each of which is an isosceles trapezoid. These magnets are starlike arranged around shaft 10, all at the same distance from the latter, with their axes of symmetry lying in a single plane perpendicular to the axis of rotation and with the minor base of the trapezoid turned toward the shaft. They are attached to a fixed support 13a, 13b having a flat circular form, at the center of which is a hole through which shaft 10 passes freely, in such a way that one of the faces of the trapezoid adheres to the plane itself. The figures do not show the fine adjustment elements which are integral with fixed support 19, the purpose of which is to regulate the distance between supports 13a and 13b and their centering with respect to shaft 10.

There are en even number of magnets in each unit; their polarization is parallel to the axis of rotation 10 of the suspended unit. Two adjacent magnets in the starlike arrangement have opposing polarities which nonetheless remain parallel with respect to the axis of rotation.

The trapezoidal elements forming the magnets of each starlike arrangement are of equal dimensions and are equidistant from one another. Together with the two adjacent magnets of the same starlike arrangement, each magnet forms a pair of magnetic circuits whose fluxes close on the respective ferromagnetic support 13a, 13b. The number of magnets is a determining factor with regard to the speed with which the position of stable axial equilibrium of the suspended system is reached. The permanent magnets constituting the starlike arrangement are separated from one another by trapezoidal sectors 14'' (FIG. 2) which are made of a non-magnetic material.

Disc 15 is made of a conductive material, for example copper, aluminium etc., mounted between above mentioned units 14a and 14b and rigidly keyed to shaft 10 so that it is parallel to the opposing surfaces of magnetic units 14a and 14b under operating conditions of the suspended system.

Between unit A and unit B is located a thrust disc 11 which serves to maintain the suspended load in a predetermined position when the magnetic suspension is not in operation.

This thrust disc (indicated in FIG. 1 in the form of a metallic ring) is firmly keyed to shaft 10 and is provided with self-lubricating gaskets on its lower face. The purpose of the latter is to enter into sliding contact with another self-lubricating gasket 12 attached to the outer upper surface of metallic cupport 13 so that the opposing surfaces contacting one another, constitute a plain bearing with little friction.

It is evident that this solution is not limiting in nature and that it may be substituted by other, for example, tapered roller bearings, self-lubricating conical bushings, or a single thrust pin mounted beneath shaft 10, etc.

The load 16 on shaft 10 can be situated between the assemblies delimited by lines A and B or between the lines of separation B and C (FIG. 1).

The power mechanism, whose fixed portion 17 is integral with support 19, is mounted between the useful load 16 and the suspension and radial centering assembly C nevertheless, it is obvious that it can be located at any other point along shaft 10 or even on upper or lower prolungations of the shaft itself which extend above or below suspension units A and C. This drive mechanism, which is irrelevant insofar as this invention is concerned, can be of any type whatsoever (electrical, pneumatic or hydraulic) as long as it does not introduce friction which might have a deleterious effect on the suspension characteristics.

Figure 4:
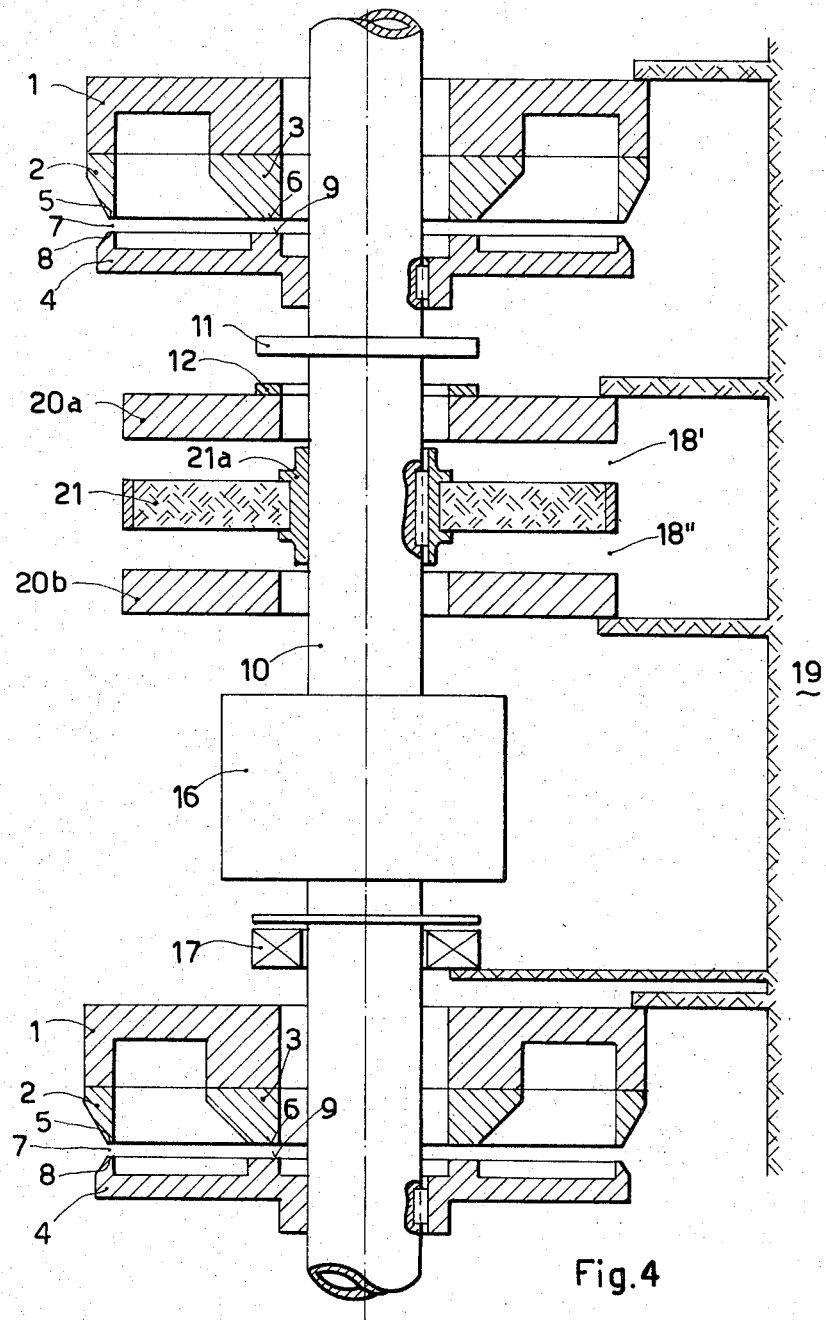
FIG. 4 is a schematic axial cross-section of the device concerned in this invention, in a second form or realization.

FIG. 4 illustrates a variation of the axial balancing assembly included between lines A and B of FIG. 1 and consists of the substitution of central unit 15 by a star-like arrangement of magnets. Thus, radial units 14a and 14b are replaced by conductive elements 20a and 20b which are integral with support 19 and are also equipped with adjustment devices which are not shown but which were also envisaged in the preceding case.

In this latter case, the ferromagnetic supports 13a and 13b shown in FIG. 1 are eliminated because they are superfluous, and the mobile portion 11 of the thrust bearing rests on the upper surface of element 20a by means of fixed part 12.

The parts comprising the rest of the unit remain unchanged and retain in FIG. 4 the same numbering system used in FIG. 1.

Taking FIG. 1 as a reference, the device functions as follows: when the system, and therefore, also the load, is not rotating, thrust bearing 11 is in contact with bearing 12. In this position air gap 18'' is narrower than air gap 18'; furthermore, due to the absence of relative movement of disc 15 with respect to parts 14a and 14b, the magnetic circuits generated by parts 14a and 14b will not induce on the surfaces presented by disc 15, which is made of conductive material, those parasitic currents which produce the repellent force necessary for axial centering of the suspended body.

Radial centering is ensured by means of assemblies A and C which simultaneously provide most of the support for the suspended load inasmuch as they function in the same manner as the device disclosed in the co-pending patent application mentioned above.

When the suspended unit, that is the object and the mobile portion of the mechanism is placed into rotation by means of drive element 17, between disc 15 and the series of magnetic circuits formed by the magnets which compose units 14a and 14b there will be a relative motion which induces parassitic currents in body 15. Based on well known principles, these currents in turn generate magnetic fluxes which oppose those produced by the magnets. Therefore, between each set of magnets and disc 15 there results a reciprocal repellent action whose strength, assuming that other conditions remain the same, will be inversely proportional to the width of air gap 18' and 18'' between the disc and the radial series of magnets.

The device has been so dimensioned that at operating speed, air gaps 18' and 18'' have the same value. It is evident that any disturbing action which tends to displace disc 15 from the position in which the air gaps are equal will be opposed by the action of the radial magnets, since with respect to the disc, the repellent action of the radial sets of magnets will increase as the size of the relative air gap decreases.

Aside from the dimensions of the air gap, other factors which have a determining influence on the repellent action of the radial magnets on disc 15 are, in addition to the rotational speed, the number of magnets (upon which depends the frequency of the alternance of the flux cut by disc 15), the electromagnetic and electroconductive characteristics of disc 15, and the thickness of the latter.

In dimensioning the magnetic member which provides axial balance, particular account must be taken of the fact that before the rotating body reaches a speed which might jeopardize the integrity of the thrust bearing, the repellent action of the magnets with respect to disc 15 must already have reached a value high enough to separate the rotary thrust member from the fixed portion of the thrust bearing itself. As was noted, this result can be obtained by acting on the thickness of disc 15 and on the number of radial magnets.

Any tendency of the shaft of the rotary system to deviate from its ideal centering position will be compensated by tapers 5 and 8 of units A and C. Since this action is simultaneously exerted at the two ends of shaft 10, it will be more efficacious than that which would be obtained by limiting it to one end alone, especially for purposes of counteracting those torque couples which might cause an angular deviation of shaft 10 with respect to the axis of rotation.

With regard to the variation shown in FIG. 4, this differs from FIG. 1 only as concerns the origin of the repellent forces providing axial centering and their action. In fact, in this case, since the radial set of magnets 21 is placed into rotation, the fluxes issuing from the two faces of the radial magnets will be intercepted by conductive elements 20a and 20b, which are integral with fixed support 19 and which are respectively opposite to them. Thus the effect of the rotation of the magnets on the conductive elements is exactly the same as that envisioned in the solution illustrated in FIG. 1.

What is claimed is:

1. A magnetic suspension device for a body integral with a shaft rotatable around a vertical axis in which the forces which oppose the weight of the suspended body to sustain it are of a magnetic nature and the rotating elements are separated from surrounding fixed objects by space occupied by a fluid which device includes at least two radial centering suspension units and one axial balancing unit spaced along the shaft; the radial centering suspension units constituting two spaced ferromagnetic discs, one of which functions as a magnet and the other as an armature, one surface of each of these discs being flat, while the other being provided with two circular projections, one peripherally positioned and the other more centrally positioned which face corresponding circular projections on the other disc, said discs being parallel to one another and coaxial with the shaft, one of the discs being fixed and provided with a central hole through which the shaft passes freely, and the other being integral with the shaft; in which device the central projection of the disc which acts as an armature has a rectangular section and the peripheral projection has a trapezoidal section whose base faces the disc which functions as a magnet, this disc being provided with two annular pole pieces made of permanently magnetic material which are fixed to the two above mentioned circular projections, of which annular pole pieces the peripheral one, which must provide most of the centering action, having a trapezoidal cross section whose major base is in contact with the tip of the peripheral projection and is firmly attached to it, while the minor base faces the tip of the corresponding peripheral projection of the other disc, the central pole piece which must furnish most of the supporting action, also having a trapezoidal section whose major base is fixed in contact with the tip of the central projection, while its minor base faces the tip of the central projection of the other disc, said pole pieces having the same polarity; the axial equilibrium unit comprising two identical fixed magnetic elements each of which consists of a support to which are attached a number of identical permanent magnets, each of which has its own axis of symmetry passing through its center of gravity, these magnets being arranged around the shaft at an equal distance therefrom with their axes of symmetry lying in a single horizontal plane and angularly equidistant from one another, these magnets being magnetized parallel to the axis but alternately one in one direction and the two on either side thereof of opposite direction; a circular flat conductive disc whose faces are parallel keyed to the shaft, said disc being located between said elements and spaced therefrom; a thrust bearing disc fixed to the shaft to support the load when it is stationary or rotating slowly and means to rotate the shaft.

2. The device of claim 1 in which the axial balancing unit is located between the two radial centering suspension units.

3. The device of claim 1 in which each element comprises a fixed circular magnetic plate made of ferromagnetic material coaxial with the shaft and furnished with a central hole through which the shaft passes freely; on the face of the plate, facing the conductive disc, are attached the prismatical magnets which have an isosceles trapezoidal shape, with the larger base of the prism contacting the circular plate and the smaller base facing the shaft.

4. A magnetic suspension device for a body mounted on a shaft rotatable around a vertical axis, in which the forces which oppose the weight of the body for support of the latter are of a magnetic nature and the rotary elements are spaced from the fixed parts; said device comprising at least two suspension and radial centering units and an axial balancing unit spaced along the shaft; the axial balancing unit consisting of a pair of stationary circular discs made of a conductive material and provided with a central hole through which the shaft passes freely and a support keyed to the shaft in an intermediate position along the axis of rotation between the two discs, said support carrying a number of identical permanent magnets each of which has an axis of symmetry through its center of gravity, which magnets are arranged around the shaft at an equal distance from it, with their axes of symmetry located on a single horizontal plane and equidistant from one another; which magnets are integrated with one another and with above mentioned shaft and are alternately polarized, one in one direction and the adjacent two in an opposing direction all parallel to the axis of rotation; which device, in addition, includes a thrust bearing for supporting the load when the latter is at rest or is rotating slowly and means to rotate the shaft.

5. The device of claim 4 in which the axial balancing unit is situated between the two suspension and radial centering units.

6. The device of claim 4 in which the permanent magnets which comprise the axial balancing system have a right prismatic form with an isosceles trapezoidal plan view, the minor base of which trapezoid faces the shaft and whose trapezoidal faces are parallel to the plane which contains the axes of symmetry of the magnets.

* * * * *